US011269978B2

(12) United States Patent
Cohen et al.

(10) Patent No.: US 11,269,978 B2
(45) Date of Patent: Mar. 8, 2022

(54) DETECTION OF SLOW BRUTE FORCE ATTACKS BASED ON USER-LEVEL TIME SERIES ANALYSIS

(71) Applicant: Microsoft Technology Licensing, LLC, Redmond, WA (US)

(72) Inventors: Dror Cohen, Tel Aviv (IL); Jonatan Zukerman, Kiryat Ono (IL); Noa Esther Aviv Hamamy, Tel Aviv (IL); Yossef Basha, Kadima (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 16/869,351

(22) Filed: May 7, 2020

(65) Prior Publication Data

US 2021/0349979 A1    Nov. 11, 2021

(51) Int. Cl.
*G06F 21/00* (2013.01)
*G06F 21/31* (2013.01)
*G06F 21/55* (2013.01)

(52) U.S. Cl.
CPC .......... *G06F 21/316* (2013.01); *G06F 21/552* (2013.01); *G06F 21/554* (2013.01)

(58) Field of Classification Search
CPC .... G06F 21/316; G06F 21/552; G06F 21/554; G06F 21/31; G06F 21/45; H04L 63/1408; H04L 63/1416; H04L 63/1433; H04L 63/1425

See application file for complete search history.

(56) References Cited

U.S. PATENT DOCUMENTS

| | | | | |
|---|---|---|---|---|
| 2005/0216955 | A1* | 9/2005 | Wilkins | H04L 63/1408 726/23 |
| 2007/0067853 | A1* | 3/2007 | Ramsey | G06F 21/316 726/28 |
| 2007/0169194 | A1* | 7/2007 | Church | G06F 21/554 726/23 |
| 2011/0185419 | A1* | 7/2011 | Boteler | G06F 21/55 726/22 |

(Continued)

OTHER PUBLICATIONS

"International Search Report and Written Opinion Issued in PCT Application No. PCT/US21/022451", dated May 27, 2021, 11 Pages.

*Primary Examiner* — Edward Zee
(74) *Attorney, Agent, or Firm* — Fiala & Weaver P.L.L.C.

(57) ABSTRACT

Methods, systems and computer program products are provided for detection of slow brute force attacks based on user-level time series analysis. A slow brute force attack may be detected based on one or more anomalous failed login events associated with a user, alone or in combination with one or more post-login anomalous activities associated with the user, security alerts associated with the user, investigation priority determined for the user and/or successful logon events associated with the user. An alert may indicate a user is the target of a successful or unsuccessful slow brute force attack. Time-series data (e.g., accounted for in configurable time intervals) may be analyzed on a user-by-user basis to identify localized anomalies and global anomalies, which may be scored and evaluated (e.g., alone or combined with other information) to determine an investigation priority and whether and what alert to issue for a user.

20 Claims, 7 Drawing Sheets

(56) References Cited

U.S. PATENT DOCUMENTS

2014/0059683 A1 2/2014 Ashley
2015/0319185 A1 11/2015 Kirti et al.
2020/0089848 A1 3/2020 Abdelaziz et al.

* cited by examiner

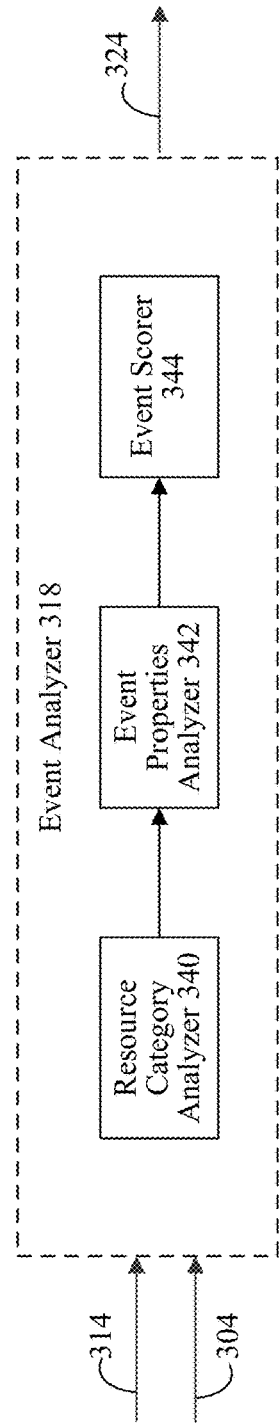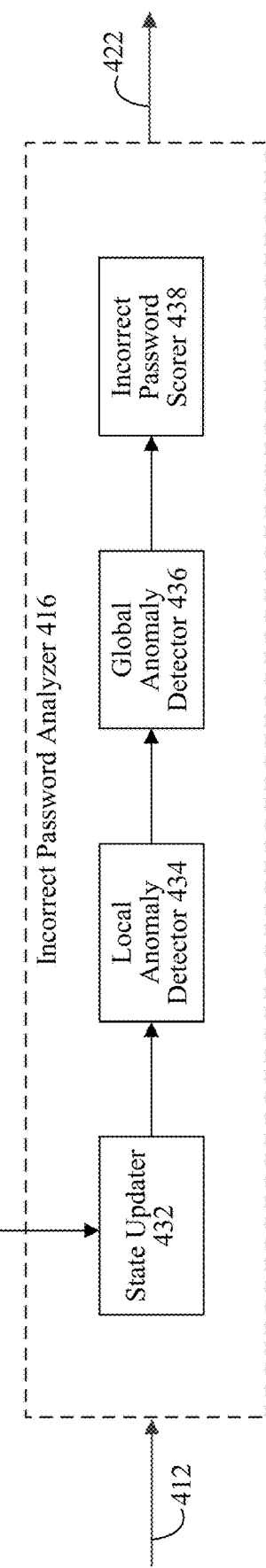

디텍션 OF SLOW BRUTE FORCE ATTACKS BASED ON USER-LEVEL TIME SERIES ANALYSIS

BACKGROUND

Hackers launch brute-force attacks on user accounts by submitting many passwords for one or more users in attempts to guess them and gain access to the user accounts. A brute-force attack may be detected, for example, based on the number of incorrect password attempts. A hacker may launch a slow brute-force attack to avoid being detected by submitting a reduced number of password attempts spread across many different time windows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for detection of slow brute force attacks based on user-level time series analysis. A slow brute force attack may be detected based on one or more anomalous failed login events associated with a user, alone or in combination with one or more post-login anomalous activities associated with the user, security alerts associated with the user, investigation priority determined for the user, and/or successful logon events associated with the user. An alert may indicate a user is the target of a successful or unsuccessful slow brute force attack. Time-series data (e.g., accounted for in configurable time intervals) may be analyzed on a user-by-user basis to identify localized anomalies and global anomalies, which may be scored and evaluated (e.g., alone or combined with other information) to determine an investigation priority and whether and what alert to issue for a user.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows an example of an event analyzer, according to an example embodiment.

FIG. 4 shows an example of an incorrect password analyzer, according to an example embodiment.

Figure 1:
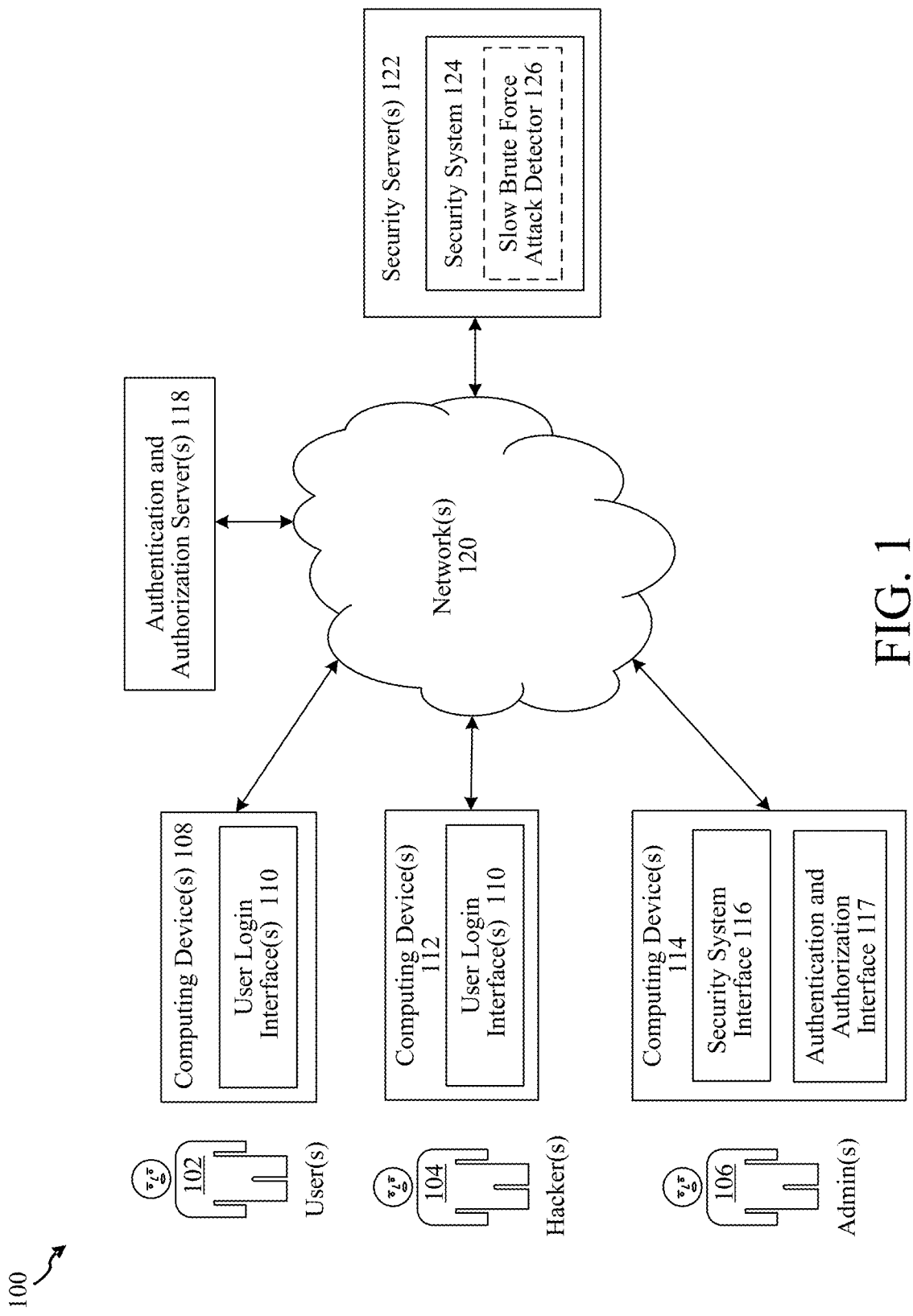
FIG. 1 shows a block diagram of a system for detection of slow brute force attacks based on a user-level time series analysis, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

User access control may be provided by authentication and authorization. Authentication is a process of proving that a user is who the user claims to be. Authentication may challenge a party for legitimate credentials (e.g., username, password) as a basis to create a security principal used for identity and access control. Authorization is the act of granting an authenticated security principal permission to do something. Authorization may specify what data a user is allowed to access and what the party can do with it.

Authentication may be provided by an authentication service. An authentication service may provide a security (e.g., identity or access) token to a user who provides legitimate credentials. Authorization may be provided by an authorization provider. An authorization provider may be implemented in a particular application or resource or may be implemented externally applicable across multiple resources.

User authentication and authorization may be provided by a cloud service. Microsoft® Azure® Active Directory® (AD) is an example of a cloud-based identity and access management service provider, and numerous other types exist.

A user may provide credentials when logging in to one or more identities, accounts or contexts. An identity is a (e.g., digital) representation of a user. An identity may be provided by a user account. A user may have multiple identities (e.g., multiple accounts). Identities may have contexts. For example, an identity context may be based on circumstantial information (e.g., user environment, activity, location, software, hardware, domain and so on). A context may be used to vary an identity (e.g., user representation, access).

A "brute-force attack" is an attempt by a hacker to gain access to one or more user accounts not owned by the hacker. In such an attack, the hacker submits many passwords to one or more user accounts of one or more users. The detection of this attack may be accomplished based on analysis of wrong password attempts. As an attempt to avoid detection, the hacker may perform a "slow brute-force attack." This type of attack is characterized by creation of small amounts of password attempts that are spread across different time windows. This spreading-out of password attempts is a way of hiding the fact that the hacker is trying to gain access, such that the attempt to gain access goes unnoticed.

Detection of a slow brute-force attack is a complex task. Since the attacker usually avoids generating a large amount of wrong password attempts in any particular time period, the traditional threshold-based detector may not detect the attack.

Embodiments are disclosed herein for detection of slow brute force attacks based on user-level time series analysis. A slow brute force attack may be detected based on one or more anomalous failed login events associated with a user, alone or in combination with further information, such as one or more post-login anomalous activities associated with the user, security alerts associated with the user, investigation priority determined for the user, and/or successful logon events associated with the user.

In one embodiment, a model is trained to detect anomalies in wrong passwords pattern. It is noted that some wrong password attempts may be performed as a part of a valid user's normal login routine. As such, the trained model may be configured to consider the variance between different users and time windows. Furthermore, anomalies exist in a wrong password attempt pattern that do not necessarily indicate that indeed an attack was made. Even if there was such an attack, embodiments distinguish between successful and unsuccessful attacks, which have different levels of urgency. As such, in embodiments, alerts generated by the trained model may be combined with additional knowledge regarding the user's abnormal behavior, to determine if the user is indeed compromised.

As such, in an embodiment, instead of analyzing login attempt data at the group level (e.g., business/organizational level), a real-time anomaly detection model may be generated that is defined on the user scope. Input events to the model may be partitioned into buckets according to their creation times, and anomalies detected using a sliding window. Thus, a variance in a pattern of wrong password attempts that is different for each user is handled. Furthermore, in an embodiment, the model may detect global anomalies using a built-in ranking mechanism, to avoid scoring anomalies that are not suspicious enough in comparison to past anomalies. In a further embodiment, an event score is aggregated and used to update the user's investigation priority. This enables an alert to be triggered if a scored anomaly is detected in adjacency to other abnormal activities performed by the user. For instance, a "successful brute-force" alert may be triggered if the following sequence is detected: (1) a suspicious wrong password event, (2) a successful logon event performed for the same user, and (3) a significant increment in the user investigation priority score.

These and further embodiments are described in detail as follows. For instance, FIG. 1 shows a block diagram of a system 100 for detection of slow brute force attacks based on a user-level time series analysis, according to an example embodiment. Example system 100 presents one of many possible example implementations. System 100 may comprise any number of computing devices and/or servers, such as the example components illustrated in FIG. 1 and other additional or alternative devices not expressly illustrated. Other types of computing environments involving detection of slow brute force attacks based on user-level time series analysis are also contemplated. As shown in FIG. 1, system 100 includes computing devices 108, 112 and 114, a one or more authentication and/or authorization servers 118, and one or more security servers 122, which are communicatively coupled by one or more networks 120. Security server(s) 122 includes a security system 124, which includes a slow brute force attack detector 126.

Network(s) 120 may include one or more of any of a local area network (LAN), a wide area network (WAN), a personal area network (PAN), a combination of communication networks, such as the Internet, and/or a virtual network. In example implementations, computing devices 108, 112 and 114, authentication and authorization server(s) 118 and security server(s) 122 may be communicatively coupled via network(s) 120. In an implementation, any one or more of authentication and authorization server(s) 118 and computing devices 108, 112 and 114 may communicate via one or more application programming interfaces (APIs), and/or according to other interfaces and/or techniques. Authentication and authorization server(s) 118, security server(s) 122 and/or computing devices 108, 112 and 114 may include one or more network interfaces that enable communications between devices. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Various communications between networked components may utilize, for example, HTTP, Open Authorization (OAuth), which is a standard for token-based authentication and authorization over the Internet). Information in communications may be packaged, for example, as JSON or XML files.

Computing devices 108, 112 and 114 may comprise any computing device utilized by one or more users (e.g., individual users, family users, enterprise users, governmental users, administrators, hackers, etc.). Computing devices 108, 112 and 114 may comprise one or more applications, operating systems, virtual machines, storage devices, etc. that may be executed, hosted, and/or stored therein or via one or more other computing devices via network(s) 120. In an example, computing devices 108, 112 and 114 may access one or more server devices, such as authentication and authorization server(s) 118, to access one or more secured resources (e.g., applications, databases). Computing devices 108, 112 and 114 may represent any number of computing devices. User(s) 102 may represent any number of persons authorized to access one or more computing resources. Computing devices 108, 112 and 114 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing devices 108, 112 and 114 are not limited to physical machines, but may include other types of machines or nodes, such as a virtual machine. Computing devices 108, 112 and 114 may each interface with authentication and authorization server(s) 118, for example, through APIs and/ or by other mechanisms. Any number of program interfaces may coexist on computing devices 108, 112 and 114. An example computing device with example features is presented in FIG. 9.

Computing device(s) 114 may be used, for example, by one or more admins 106 to create and manage user identities, credential requirements, user privileges, log-in procedures, monitor security system 124, etc., including for one or more users 102. Admin(s) 106 may have administrative privileges on all or a portion of authentication and authorization server(s) 118 and/or security server(s) 122. In an example, authentication and authorization server(s) 118 may comprise a cloud service available to many customers. Admin(s) 106 may use one or more applications displayed by computing device(s) 112 to create and manage user identities, credential requirements, user privileges, log-in procedures, monitor security system 124, etc. for user(s) 102 via network(s) 120. One or more applications may comprise, for example, a Web browser application, authentication and authorization interface 117, which may be implemented in any form (e.g., a desktop application, a mobile application and/or a Web application, which may be provided by authentication and authorization server(s) 118) and/or security system interface 116, which may be implemented in any form (e.g., a Web application provided by security server(s) 122). Authentication and authorization interface 117 may include any number of user interface elements/controls (e.g., graphical user interface (GUI)), including buttons, keyboards, keypads, touchpads, menus, text boxes, check boxes, etc. to interact with security system 124 and/or slow brute force attack detector 126.

Computing device(s) 108 may be used, for example, by user(s) 102 to create one or more user identities and to access and use computing resources using the one or more user identities. A user may have multiple identities (e.g., personal, business, other) across multiple platforms or independent authentication systems (e.g., Microsoft®, Google™, Yahoo®, Facebook® and so on).

One or more identities may be associated with one or more credential(s), such as, for example, a user's cell phone number, email address, etc. combined with a password. User(s) 102 may use credentials to login (e.g., to a session) for access to computing resources (e.g., devices, data and so on). User login credentials may comprise any information that may be used to verify user identity. Credential categories may comprise, for example, something a user knows (e.g., answers to one or more prompts or questions, such as a username, a password, a name of first pet and so on). A username may comprise any string of characters, images (e.g., pattern with coded data) or blob of information. In an example, a username may comprise a random string of characters, a cellular telephone number, an email address and so on. A password may comprise any string of characters and/or images (e.g., pattern with coded data).

User(s) 102 may provide (e.g., enter) credentials associated with a user identity to user login interface(s) 110, which may be a provided by authentication and authorization server(s) 118 for display by a Web browser application executed by computing device(s) 108. User login interface(s) 110 may be provided by or through one or more applications, such as, for example, a Web application (e.g., Microsoft® Office 365® Web applications) or a locally executed application (e.g., Microsoft® Office Word, Excel®), which may access data in a database (e.g., through an application programming interface (API) or agent). User login interface(s) 110 may be viewed and interacted with in a Web browser application executed by computing device 108. An application may receive one or more session artifacts (e.g., a session identity) in applicable forms, such as cookie(s) or token(s).

In an example, an application may comprise the Microsoft® Teams™ application while authentication and authorization server(s) 118 may comprise Azure® AD®. User(s) 102 may launch the application. The application may search for user(s) 102 to determine whether there is a current/active user session for user(s) 102. For example, various versions of the Microsoft® Teams™ application may search for user(s) 102 in an identity library (e.g., for desktop version), search for mobile tokens (e.g., in the mobile version), search for cookies in its domain (e.g., for web app version). Other applications may perform these functions in other ways. An application (e.g., Teams) may invoke a sign-in function that redirects to authentication and authorization server(s) 118 (e.g., Microsoft® Azure® AD), for example, when a current session does not exist for user(s) 102. Authentication and authorization server(s) 118 may present a sign-in page (e.g., login.microsoft.com). User(s) 102 may enter a username (e.g., phone number or email), press next button, then enter a password.

Secured resources (e.g., resources secured by user authentication and/or authorization) may include any type of resource, including but not limited to computing or processing resources, software resources (e.g., software as a service (SaaS), platform as a service (PaaS), etc.), storage resources (e.g., physical storage devices, local storage devices, cloud-based storages, hard disk drives, solid state drives, random access memory (RAM) devices, etc.), databases, etc.

Computing device(s) 112 may be used, for example, by one or more hackers 104 for malicious (e.g., unlawful) purposes to acquire one or more user identities for user(s) 102 and to misuse the one or more user identities for unauthorized access to computing resources. Hacker(s) 104 may have information or knowledge about one or more user(s) 102, such as one or more of a user's name, address, phone number, email address(es), employer, and so on. In attempts to gain access to computing resources (e.g., including information), hacker(s) 104 may provide incorrect and (e.g., ultimately) correct credentials (e.g., associated with one or more user identities for user(s) 102) to user login interface(s) 110, which may be a provided by authentication and authorization server(s) 118 for display by a Web browser application executed by computing device(s) 112. Brute force attacks and slow brute force attacks comprise multiple login attempts with incorrect credentials (e.g., incorrect passwords) in an attempt to gain access to a user account. A slow brute force attack is a type of brute force attack, where a hacker spreads out the login attempts over multiple time windows to avoid detection.

Authentication and authorization server(s) 118 may comprise one or more computing devices, servers, services, local processes, remote machines, web services, etc. for hosting, managing, and/or providing authentication services to users (e.g., user(s) 102. In an example, authentication and authorization server(s) 118 may comprise a server located on an organization's premises and/or coupled to an organization's local network, a remotely located server, a cloud-based server (e.g., one or more servers in a distributed manner), or any other device or service that may host, manage, and/or provide user authentication services. Authentication and authorization server(s) 118 may be implemented as a plurality of programs executed by one or more computing devices. Authentication server programs may be separated by logic or functionality, such as an identity manager, an identity validator, a session manager and a data log manager, which may collect (e.g., create and store log files) and make available to or provide (e.g., send) login, session and/or other information to security server(s) 122.

Security server(s) 122 may comprise one or more computing devices, servers, services, local processes, remote machines, etc. to manage security of one or more computers and/or resources. Security server(s) 122 may comprise a security system 124, which may perform multiple security-related functions, including, for example, a user entity behavior analytics (UEBA) service and slow brute force attack detection. A UEBA service may be available to one or more entities (e.g., individuals and/or organizations) to analyze web traffic and cloud events for a (e.g., each) user associated with the (e.g., one or more) entities. A UEBA service may generate an investigation priority score for a (e.g., each) user, for example, to indicate or report potentially suspicious activity to security personnel (e.g., system administrators) for further investigation. In an example, a higher core may indicate a higher investigation priority. Slow brute force attack detector 126 may detect or may support detection of (e.g., unsuccessful and successful) attacks that hacker(s) 104 are trying to conceal.

Slow brute force attack detector (SBFAD) 126 may perform a time-series analysis of login information (e.g., failed attempts), for example, to detect anomalies in failed logins (e.g., incorrect password(s)). SBFAD 126 may operate at a user level (e.g., a model per user). SBFAD 126 may rank and/or score anomalies, which may be integrated or combined with other security information for security decisions. For example, a UEBA service may generate (e.g., trigger) an alert, for example, if (e.g., when) based on additional information (e.g., other abnormal activities) related to a user (e.g., proximal or adjacent to a suspicious failed login). Combining security information (e.g., from UEBA and SBFAD) may increase the probability of accurate detections and alerts. Unsuccessful and successful slow brute force attacks may be distinguished (e.g., with a high degree of certainty) to identify (e.g., in real time) users whose identities have been compromised or may be targeted by hacker(s) 104. An attack start time, a successful malicious login and malicious activities of hacker(s) 104 may be identified.

SFBAD 126 may comprise a trained model for each user, for example, to determine anomalous behavior for each user, e.g., based on a normal pattern(s) of user behavior (e.g., for logins and/or post-login activities). A model may be trained to detect anomalies in failed logins (e.g., incorrect credentials, such as a password) for a particular user (e.g., a model corresponding to each of user(s) 102). A user-specific model may be trained in various ways, as would be known to persons skilled in the relevant art(s). For instance, a model for a user may be initially fit on a training dataset, which is a set of login attempts by the user. For example, the set of login attempts may be historical, and may include any sort of relevant data, including dates/times of login attempts by the user, the actual login information provided by the user (e.g., login name and password) for those attempts, indications of whether the login attempts were successful, etc. The training data is used to fit the parameters (e.g., weights of connections between neurons in artificial neural networks) of the model. Any model type may be used, including a neural net, a naive Bayes classifier, or other type. The model may be trained on the training dataset using a supervised or unsupervised learning method, for example using optimization methods such as gradient descent or stochastic gradient descent. In practice, the training dataset often consists of pairs of an input vector (or scalar) and the corresponding output vector (or scalar), where the answer key is commonly denoted as the target (or label). The current model is run with the training dataset and produces a result, which is then compared with the target, for each input vector in the training dataset. Based on the result of the comparison and the specific learning algorithm being used, the parameters of the model are adjusted. Accordingly, a user-specific model may be generated.

When attempting a login, a user may provide one or more incorrect credentials. According to embodiments, legitimate failed attempts may be distinguished from malicious login attempts, for example, by analyzing login information to identify a variance between time windows. An anomaly alone may not indicate with sufficient confidence that hacker(s) 104 is/are trying to or did break into a user account. Additional anomalies and/or additional information may improve the probability of accurate identification of malicious failed and/or successful attacks. As such, generated security alerts and additional information (e.g., pertaining to a user's normal behavior) may be combined. Successful and unsuccessful attacks may be distinguished, for example, because they have different levels of urgency, e.g., in terms of application of alerting and deploying investigative resources.

Figure 2:
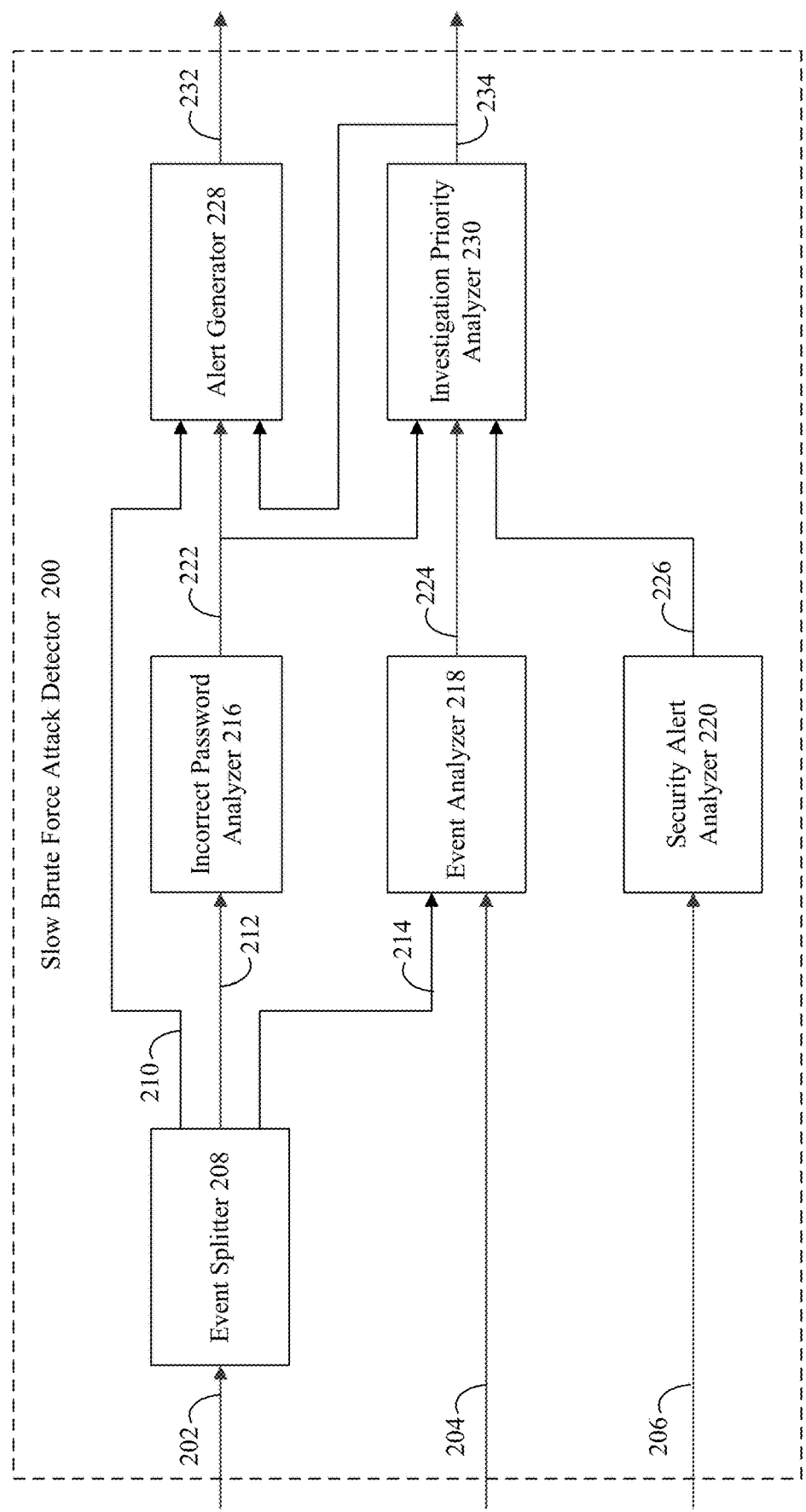
FIG. 2 shows a block diagram of a slow brute force attack detector, according to an example embodiment.

FIG. 2 shows a block diagram of a slow brute force attack detector, according to an example embodiment. Slow brute force attack detector (SBFAD) 200 is one of many examples of SBFAD 126. SBFAD 200 may comprise, for example, event splitter 208, incorrect password analyzer 216, event analyzer 218, security alert analyzer 220, alert generator 228, and investigation priority analyzer 230.

SBFAD 200 may receive one or more inputs (e.g., for each user), such as, for example, input events 202, peer information 204, and security alerts 206. SBFAD 200 may generate one or more outputs (e.g., for each user), such as, for example, potentially compromised user alert 232 and investigation priority 234.

Input events 202 may include any event that may impact a user security determination. An input event may have one or more properties, such as, for example, a timestamp, an event type, a user, one or more event properties, one or more resources involved in an event, etc. A timestamp may indicate the time of an event. An event type may distinguish between multiple types of events, such as a failed login (e.g., incorrect password) attempt, a successful logon, a Web-based collaboration platform file download, an action on a cloud computing service portal, and so on. A user may indicate an entity (e.g., a user identity) that performed an event. Event properties may include one or more aspects related to an event, such as, for example, a country, an Internet service provider (ISP), an operating system (OS), an application, a device type, etc. A resource may indicate one or more resources involved in an event, such as, for example, a site for a Web-based collaboration platform (e.g., Microsoft® SharePoint®), a target machine, a subscription of a cloud computing service (e.g., Microsoft® Azure®), etc.

Input events 202 may be configured, for example, as follows (e.g., to distinguish many users engaging in many events): {timestamp: "April 1, 10:00 PM"; event type: "sharepoint file download"; User: "user1" resource: "user1-sharepoint-site" properties: {country: US, ISP:TELECOM, OS: windows, application: chrome, device type: PC}} and {timestamp: "April 2, 09:00 PM"; event type: "wrong password attempt"; User: "user2" resource: "<one drive account>" properties: {country: IL, ISP-TELECOM, OS: windows, application: EDGE, device type: LAPTOP}}.

Event Splitter 208 may segregate or route different types of events. For example, event splitter 208 may route successful logon events 210 to alert generator 228, unsuccessful or failed login (e.g., incorrect password) events 212 to incorrect password analyzer 216 and one or more (e.g., all) other events 214 to event analyzer 218. Other event 214 types may include, for example, accessing (e.g., opening, copying, downloading) information (e.g., in cloud storage or a Web-based collaboration platform), and/or other actions (e.g., in a cloud computing service).

Peer information 204 for each of multiple users (e.g., in an organization) may be provided to/received by event analyzer 218. A list of users and their peers may be (e.g., periodically) provided (e.g., by an external service) to event analyzer 218. A list of users and their peers may be configured, for example, as follows: {user: "user1", peers: "Joe", "Jacob", "user2", "Tim", "Moshe"}.

Security alerts 206 may be provided to/received by security alert analyzer 220. Security alerts may be received as an input from security products used by an entity, such as, for example, Microsoft® Windows® Defender™, Microsoft® Azure® Advanced Threat Protection™, Microsoft® Cloud App Security™. An (e.g., each) alert may include, for example, a timestamp, one or more users, a type and/or a message. Alerts may be configured, for example, as follows: {Type: "Anonymous IP connection alert", user: user1, message: "user1 was connected from an anonymous IP", timestamp: "April 1, 10:00 PM"} and {Type: "impossible travel alert", user: user2, message: "user connected from Russia at 10 PM, and then from US at 11 PM", timestamp: "April 3, 12:00 PM"}.

SBFAD 200 may generate one or more outputs (e.g., for each user), such as, for example, potentially compromised user alert 232 and investigation priority 234. Potentially compromised user alert 232 may be generated by alert generator 228. Potentially compromised user alert 232 may indicate that one or more anomalous logons occurred and one or more anomalous (e.g., post-logon) activities have been detected. Investigation priority 234 may be generated by investigation priority analyzer 230. Investigation priority 234 may provide a priority score that may be used to prioritize investigations for security personnel (e.g., an administrator). A user interface (e.g., security system interface 116) may present a list of prioritized investigations for security personnel (e.g., admin 106), for example, based on investigation priority 234, which may be based on, at least in part, potentially compromised user alert 232.

Security alert analyzer 220 may score security alerts 206. In some examples, security alert analyzer 220 may generate an alert threat score (e.g., alert threat scores 226) having a value in a range (e.g., between 10 to 50) for a (e.g., each) security alert 206. For example, higher scores may be given to more suspicious alerts (e.g., based on more suspicious activities underlying an alert) and lower scores may be given to less suspicious alerts (e.g., based on less suspicious activities underlying an alert). In an (e.g., additional and/or alternative) example, higher scores may be given to less common (e.g., rarer) activities and lower scores for more common activities (e.g., for users within an entity). An "alert popularity" may be defined for various types of alerts. An "alert popularity" may be the percentage of alerts of a certain type of alert out of all alerts observed in an entity (e.g., for a given time period, such as the past 6 months).

Security alert analyzer 220 may maintain a state (e.g., including "alert popularity" values) for various types of alerts. A state may be updated, for example, when new alerts are received. For example, security alert analyzer 220 may, e.g., for a received security alert 206: (i) perform a state update (e.g., based on information for and/or from a received security alert 206) and (ii) score the received security alert 206. An alert may be scored, for example, in accordance with Eq. 1:

$$\text{Alert threat score} = 10 + (1 - (\text{alert popularity})) * 40 \qquad \text{Eq. 1}$$

In examples, alert popularity may be expressed as a percentage or decimal value. An alert may specify, for example: {Type: "Anonymous IP connection alert", user: user1, message: "user1 was connected from an anonymous IP", timestamp: "April 1, 10:00 PM"}. The popularity of an anonymous IP (Internet Protocol) connection alert may be, for example, 5% or 0.05 (e.g., indicating 5% of received alerts are anonymous IP connection alerts). The anonymous IP connection alert may be scored (e.g., with an alert threat score) at 48 (e.g., based on Eq. 1, 10+(1−0.05)*40=48). Alert threat scores 226 may be provided to investigation priority analyzer 230.

Event analyzer 218 may analyze events (e.g., other than successful and failed logon events) for a user and one or more others (e.g., the user's peers in an entity). Event analyzer 218 may, for example, analyze resource categories involved in events, including properties of events. Event analyzer 218 may generate threat scores for other events (event threat scores) 224 attributed to a user, for example, based on their degree of variance from the user's historical events and/or based on statistics for events and event properties attributed to the user's peers. In examples, anomalous events may include, for example, (i) connecting to the user's account using a Linux PC (personal computer) for the first time; (ii) downloading a file from a limited file hosting service (e.g., Microsoft® OneDrive®) site; and/or (iii) connecting to a Web-based collaboration platform (e.g., Microsoft® SharePoint®) site from an unusual country rarely or never utilized by the user or peers in an entity.

FIG. 3 shows an example of an event analyzer 218, according to an example embodiment. FIG. 3 shows one of multiple examples of event analyzer 218. Event analyzer 318 may receive as inputs other events 314 (e.g., information access events) and peer information 304 (e.g., a list of users and their peers and statistical information about peers). Event analyzer 318 may generate threat scores for other events (event threat scores) 324. Event analyzer 318 may comprise, for example, resource category analyzer 340, event properties analyzer 342 and event scorer 344.

Resource category analyzer 340 may analyze usage of one or more resources by a user, the user's peers and (e.g., all) users in an entity. Resource category analyzer 340 may monitor and analyze data pertaining to resource categories. Resource category analyzer 340 may maintain a state with statistical information regarding one or more (e.g., all) resources for (e.g., within) an entity (e.g., an organization). Resource category analyzer 340 may, for example, maintain the following information (e.g., for each resource and/or each type of resource): (i) "user popularity" (e.g., a percentage of days in a time period, such as the past month, in which a user has used a resource); (ii) "peers popularity" (e.g., a percentage of a user's peers who have used a resource in a time period, such as the past 6 months); and/or (ii) "organization popularity" (e.g., a percentage of users (including the user, user's peers and other users) in an organization associated with the user who have used the resource in a time period, such as the past 6 months.

Resource category analyzer 340 may, for an (e.g., each) input event, perform (i) a state update (e.g., to update a count for a relevant type of event and any other data obtained from the event) and (ii) a statistical features calculation (e.g., based on the updated state). In an example, an input event (e.g., for a resource user1-sharepoint-site) may indicate: {timestamp: "April 1, 10:00 PM"; event type: "sharepoint file download"; User: "user1" resource: "user1-sharepoint-site" {properties: "country-US, ISP":TELECOM, OS: windows, application: chrome, device type: PC}. A statistical features calculation (e.g., after a state update) may indicate, for example: {"user popularity" (user1-sharepoint-site): 0%, "organization popularity" (user1-sharepoint-site): 51%, "peers popularity" (user1-sharepoint-site): 6%}.

Event properties analyzer 342 may analyze events to maintain statistics regarding event properties (e.g., ISP, Country, device, etc.). Event properties analyzer 342 may, for a (e.g., each) received event, perform a state update and calculate a (e.g., an updated) popularity value for each property of a received event. In an example, an input event may have the following properties: {timestamp: "April 1, 10:00 PM"; event type: "SharePoint file download"; User: "user1" resource: "user1-sharepoint-site" {properties: "country-US, ISP":TELECOM, OS: windows, application: chrome, device type: PC}}. A statistical features calculation (e.g., after a state update) may indicate, for example: {"user popularity" (US): 0%, "organization popularity" (US): 21%, "peers popularity" (US): 30%, "user popularity" (Google Chrome™ browser): 75%, "organization popularity" (Google Chrome™ browser): 11%, "peers popularity" (Google Chrome™ browser): 13%, "user popularity" (TELECOM): 0%, "organization popularity" (TELECOM): 12%, "peers popularity" (TELECOM): 1%, "user popularity" (Microsoft® Windows®): 71%, "organization popularity" (Microsoft® Windows®): 18%, "peers popularity" (Microsoft® Windows®): 16%, "user popularity" (PC): 0%, "organization popularity" (PC): 4%, "peers popularity" (PC): 18%}.

Event scorer 344 may score received events, for example, based (e.g., at least in part) on statistics maintained by resource category analyzer 340 and event properties analyzer 342. Event scorer 344 may generate a threat score value for an (e.g., each) event. A threat score value may, for example, range from 0 to 10, where a score of 0 may indicate that the event is not anomalous and a score of 10 may indicate that the event is anomalous (e.g., and therefore suspicious).

An event threat score value may be calculated, for example, according to one or more (e.g., selectable) algorithms. Following is one of many potential algorithms. An event threat score value may be zero, for example, if the "user popularity" of the resource is greater than 0%. A user popularity greater than zero percent may indicate that the user has used the resource before (e.g., and therefore the event is not deemed anomalous). An "aggregated organization popularity" value may be calculated to be, for example, the average of (e.g., all) "organization popularity" values (e.g., including both resource and properties). Properties with user popularity greater than 0% are omitted from the example calculation. An "aggregated peers popularity" value may be calculated to be, for example, the average of (e.g., all) "peers popularity" values (e.g., including both resource and properties). Properties with user popularity greater than 0% are omitted from the example calculation. A threat score may be defined, for example, in accordance with Eq. 2:

$$(1-\text{maximum}(\text{"Aggregated peers popularity"},\text{"Aggregated organization popularity"}))*10 \quad \text{Eq. 2}$$

An example is presented for calculating an event threat score value for a received event. Resource category analyzer 340 and event properties analyzer 342 may generate, for example, the following statistics based on a received event (e.g., other events 314): (i) resource popularity: {"user popularity" (user1-sharepoint-site): "0%", "organization popularity" (user1-sharepoint-site): 51%, "peers popularity" (user1-sharepoint-site): 6%} and (ii) properties popularities: {"user popularity" (US): "0%", "organization popularity" (US): 21%, "peers popularity" (US): 30%, "user popularity" (Google Chrome™ browser): "75%", "organization popularity" (Google Chrome™ browser): 11%, "peers popularity" (Google Chrome™ browser): 13%, "user popularity" (TELECOM): "0%", "organization popularity" (TELECOM): 12%, "peers popularity" (TELECOM): 1%, "user popularity" (Microsoft® Windows®): "71%", "organization popularity" (Microsoft® Windows®): 18%, "peers popularity" (Microsoft® Windows®): 16%, "user popularity" (PC): "0%", "organization popularity" (PC): 4%, "peers popularity" (PC): 18%}. In an example, a threat score may be determined in stages (e.g., four stages). In a first stage, the user popularity of the resource is 0%. The process continues to a second stage. In a second stage, "Aggregated organization popularity" may be determined to be 22% (e.g., (51%+21%+12%+4%)/4=22%). In a third stage, "Aggregated peers popularity" may be determined to be 13.75% (e.g., (6%+30%+1%+18%)/4=13.75%. In a fourth stage, a threat score value of 7.8 may be determined for the received event (e.g., (1−maximum (13.75%, 22%))*10= (1−0.22)*10=7.8).

Incorrect password analyzer 216 may detect slow brute force attacks (e.g., alone or in conjunction with other components in a slow brute force detector). The term incorrect password may be used interchangeably with failed login for a user. Incorrect password analyzer 216 may receive as input failed login (e.g., incorrect password) events 212 and may generate incorrect password event scores 222. Incorrect password analyzer 216 may perform user-level, time-series anomaly detection of failed login attempts. Incorrect password analyzer 216 may rank and (e.g., selectively) score failed login (e.g., incorrect password) events 212 for a (e.g., each) user. Incorrect password analyzer 216 may be implemented in one or more stages, for example, as shown in FIG. 4.

FIG. 4 shows an example of an incorrect password analyzer 416, according to an example embodiment. Incorrect password analyzer 416 is one of multiple examples of incorrect password analyzer 216 of FIG. 2. Incorrect password analyzer 416 may include a model (e.g., as described elsewhere herein) for each user, for example, trained to identify anomalous login behavior for each user. Incorrect password analyzer 416 may be implemented, for example, as a machine learning model (e.g., as described elsewhere herein), scoring wrong password attempts based on their level of abnormality.

Incorrect password analyzer 416 may receive as input unsuccessful or failed login (e.g., incorrect password) events 412. Incorrect password analyzer 416 may generate incorrect password event scores 422. Incorrect password input 412 may comprise a series of wrong password events' timestamps that may be attributed to a certain user: $\{e1, e2, \ldots\} \subseteq \mathbb{N}$. Input events may arrive sequentially. The output for each input event e may be a score value $SCORE(e) \geq 0$, which may reflect the level of abnormality of input event e. A score may be determined based on the history of the user, without knowing which events may arrive in the future. A model (e.g., for each user, as described above) may be composed out of multiple stages (e.g., state update, local anomaly detection and ranking, global anomaly detection and ranking, and scoring). Incorrect password analyzer 416 may comprise, for example, a state updater 432, a local anomaly detector 434, a global anomaly detector 436, and an incorrect password scorer 438. Local anomaly detector 434, global anomaly detector 436, and incorrect password scorer 438 may each utilize the model to perform its functions.

State updater 432 may maintain (e.g., update and store) states for time-series event data (e.g., intervals or buckets) 430 (e.g., based on incorrect password events 412) for each user. Memory consumption may be reduced, for example, by not maintaining timestamps in stored time-series event data 430. A per-user data model may maintain a series of buckets, denoted by $\{B_1, \ldots, B_m\} \subseteq \mathbb{N}$, which may correspond to consecutive time ranges (e.g., with equal durations). A (e.g., each) bucket $B_i$ may represent the total amount of incorrect password attempts performed during a corresponding time range i. A time range length may be selected, for example, as eight hours (e.g., to reflect the natural partition of a day into three parts, such as working hours, post-work and nighttime hours). Other time ranges for intervals/buckets may be selected. State updater 432 may perform a state update stage of an event e, for example, by incrementing a corresponding bucket by a value (e.g., one). Event e may be added to the most recently created bucket, for example, if event e is not significantly delayed. A significantly delayed event may be scored zero (e.g., SCORE(e)=0), for example, for simplification. State updater 432 may result in an updated set of buckets $\{B_1, \ldots, B_m\}$, such that the last bucket $B_m$ includes the most recent input event e.

Local anomaly detector 434 may detect and rank anomalous failed login events for a (e.g., each) user. Local anomaly detector 434 may (e.g., for each bucket $B_i$) denote the mean and standard deviation of the preceding group of buckets in a time window, respectively, as $(\mu_i, \sigma_i)$. A bucket $B_i$ may be determined to be locally anomalous, for example, if the bucket's value (e.g., based on the number of incorrect password events that occurred during the bucket) is larger than the mean of its preceding buckets $\mu_i$ by a threshold amount. A threshold may be determined, for example, by multiplying the standard deviation of preceding buckets by a parameter α greater than zero (α>0). In other words, a bucket Bi may be determined to be anomalous, for example, based on Eq. 3:

$$B_i > \mu_i + \alpha \cdot \sigma_i \qquad \text{Eq. 3}$$

Global anomaly detector 436 may determine whether locally anomalous buckets are globally anomalous. Buckets that have been determined to be locally anomalous (locally anomalous buckets) may be ranked, for example, according to their abnormality level. A residual may be defined for a (e.g., each) anomalous bucket Bi. A residual ri for a bucket Bi may be defined by a distance of the bucket's value from the mean value μi, for example, in accordance with Eq. 4:

$$r_i = B_i - \mu_i \qquad \text{Eq. 4}$$

A normalized residual $\hat{r_i}$ of a bucket $B_i$ may be defined, for example, in accordance with Eq. 5:

$$\hat{r_i} = (r_i + 1)/(\mu_i + 1) \qquad \text{Eq. 5}$$

Buckets may be ranked, for example, based on their normalized residual value. In examples, the higher the residual, the more significant the anomaly.

A bucket $B_i$ may be determined to be globally anomalous, for example, if the bucket's normalized residual value $\hat{r_i}$ is larger than normalized residual values of (e.g., a selected number or window of) preceding (e.g., locally anomalous) buckets. In examples, a bucket $B_i$ may be determined to be globally anomalous, for example, in accordance with Eq. 6:

$$\hat{r_m} > \max\{\hat{r_1}, \ldots, \hat{r_{m-1}}\} \qquad \text{Eq. 6}$$

Figure 5B:
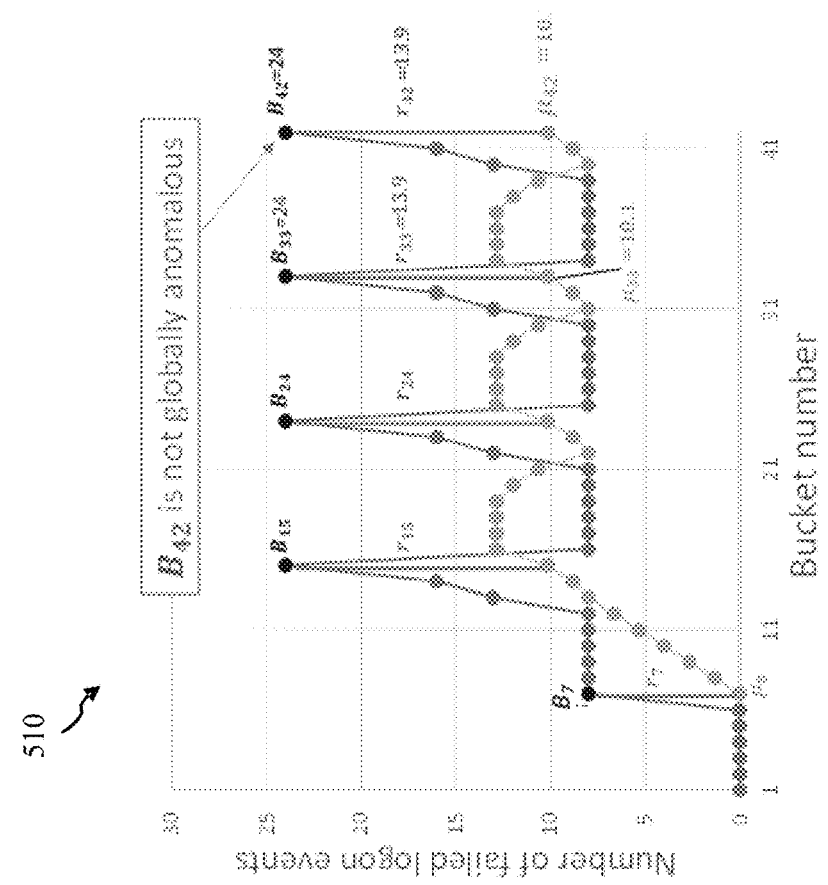
FIGS. 5A and 5B show plots illustrating examples of an analysis of whether locally anomalous incorrect password intervals are globally anomalous, according to example embodiments.
Figure 5A:
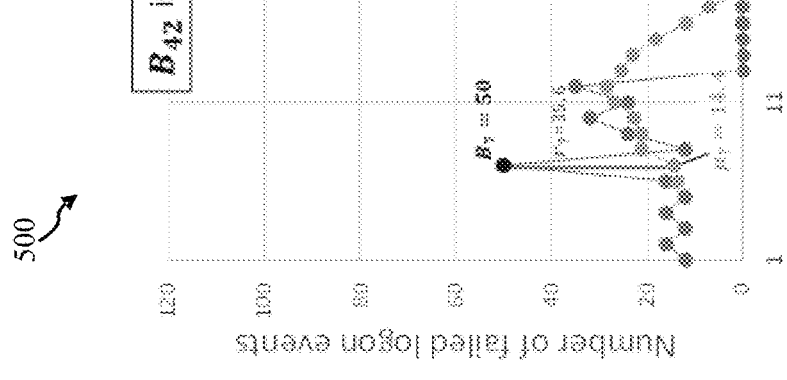

FIGS. 5A and 5B show plots 500 and 510, respectively, that illustrate an example of determining whether locally anomalous incorrect password intervals are globally anomalous, according to an example embodiment. Plots 500 and 510 demonstrate the results of an example anomaly detection algorithm for two differing cases of failed login events and event histories. In the examples of plots 500 and 510, incorrect password attempts are partitioned into 42 buckets in a total time range of two weeks (e.g., three buckets per day over 14 days). The darker dots represent the number of wrong password attempts in each bucket $\{B1, \ldots, B42\}$ and the and the lighter gray dots represent the rolling average values $\{\mu1, \ldots, \mu42\}$. Locally anomalous bucket values are represented by dots at peaks with an associated bucket number (e.g., B7 and B42 in example plot 500, and B7, B15, B24, B33 and B42 in example plot 510). Vertical lines with a numbered r value represent the residual values for the locally anomalous buckets. For reference, a numbered mean value is shown for each residual value. A width of a rolling average window may be specified or configured. A width of a rolling average window is set to six (6) buckets for plots 500 and 510. In plots 500 and 510, the forty second bucket (B42) is determined to be locally anomalous. A determination is made as to whether bucket B42 is globally anomalous. With reference to plot 500, B42 may be determined to be globally anomalous, for example, because B42 has the largest normalized residual value among the locally anomalous buckets (e.g., $r42\hat{}=74+1\ 26+1=2.77>r7\hat{}=35.6+1\ 14.4+1=2.37$). With reference to plot 510, B42 may be determined to not be globally anomalous, for example, because B42 does not have the largest normalized residual value among the locally anomalous buckets (e.g., $r42\hat{}=r33\hat{}=13.9+1\ 10.1+1$). It is notable that, using the foregoing example anomaly detection algorithm, bucket B15 in plot 510 would be determined to be globally anomalous, while buckets B24, B33 and B42 would not be determined to be globally anomalous.

Incorrect password scorer 438 may score events (e.g., events above a threshold) in globally anomalous time intervals (e.g., buckets). A score function SCORE(e) may assume that event e being scored is included in the most recently created bucket $B_m$. Events in buckets $B_m$ that are not globally anomalous may be scored zero (e.g., set SCORE (e)=0). A score may be calculated for events in anomalous buckets, for example, in accordance with Eq. 7:

$$SCORE(e) = \eta^t \cdot MAXSCORE \qquad \text{Eq. 7}$$

where SCORE(e) may be a failed login (e.g., incorrect password) event threat score, $\eta$ (e.g., $1 \geq \eta > 0$) may be a decade factor, t (e.g., $t>0$) may be the number of scored events in the bucket, and MAXSCORE (MAXSCORE>0) may be a (e.g., constant) value describing a maximum score that may be given to a failed login attempt.

In examples, incorrect password analyzer 216 processing failed login events may be combined with other components processing other information, for example, to improve the accuracy of slow brute force attack alerts. A multi-stage implementation may have a first stage based on a user-level, time series anomaly detection, ranking and selective scoring of incorrect password attempts. A second stage may integrate incorrect password scores with a user entity behavior analytics (UEBA) system configured to trigger an alert, for example, if (e.g., when) other abnormal activities are detected in adjacency to a suspicious incorrect password event. Multiple stages may provide a high certainty detection of compromised users, may pinpoint an attack start time, and may identify hacker activities. Event analyzer 218 and security alert analyzer 220 may generate information utilized in a second stage. Investigation priority analyzer 230 and alert generator 228 may integrate information processed by incorrect password analyzer 216, investigation priority analyzer 230 and alert generator 228.

Investigation priority analyzer 230 may generate investigation priority values (e.g., scores) 234 for a (e.g., each) user based on received inputs, e.g., incorrect password event scores 222, other event threat scores 224 and alert threat scores 226. A (e.g., each) score may comprise or indicate, for example, a user and a timestamp. Investigation priority analyzer 230 may maintain one or more states comprising, for example, incorrect password event scores 222, other event threat scores 224 and alert threat scores 226 for a (e.g., rolling) time period (e.g., two weeks). Investigation priority score 234 for a user may comprise, for example, a sum of the user's incorrect password event scores 222, other event threat scores 224 and alert threat scores 226 for a time period. In other examples, a user's investigation priority score 234 may comprise an average (e.g., a weighted average) of scores over a time period.

Alert generator 228 may generate potentially compromised user alerts 232 based on received inputs, e.g., successful logon events 210, incorrect password event scores 222 and investigation priority scores 234 (e.g., including timestamps). Alert generator 228 may maintain one or more states, e.g., successful logon events 210, incorrect password event scores 222 and investigation priority scores 234 (e.g., including timestamps) for a time period (e.g., two days). Alert generator 228 may update states, for example, upon receiving an input. Alert generator 228 may search for a pattern or sequence (e.g., within a time period), for example, by executing a routine, which may be periodic. In examples, a pattern or sequence may comprise (e.g., in a time interval, such as 24 hours): (i) a suspicious incorrect password event associated with a user; (ii) a successful logon event of the user; and (iii) an (e.g., a threshold) incrementation (e.g., increase) of the user's investigation priority score. A threshold may be fixed or variable. In examples, a threshold increment may comprise a new score that exceeds (e.g., is greater than) a previous (e.g., an old) score by a threshold (e.g., a percentage, such as at least 50%, and/or by a value, such as at least 20). In an example, an existing (e.g., a most recent past) investigation priority score for a user may be 25. A current (e.g., a new) investigation priority score for a user may be 100. The new score is higher than the old score by a percentage of 300% and by a value of 75, which may form the basis for alert generator 228 to generate a potentially compromised user alert 232 for the user. In an example, an existing (e.g., a most recent past) investigation priority score for a user may be 2. A current (e.g., a new) investigation priority score for a user may be 10. The new score may be higher than the old score by a percentage of 400% and by a value of 8, which may not form the basis for alert generator 228 to generate a potentially compromised user alert 232 for the user (e.g., because 8 is less than a threshold value of 20). An alert may indicate that a user is compromised (e.g., based on an integration of multiple types of security information), which may distinguish between users who are not compromised (e.g., by a slow brute force attack).

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines.

Embodiments may also be implemented in processes or methods. For example, security system 124, slow brute force attack detector 126 and/or 200 or components therein (e.g., as shown in FIGS. 2-4) may operate, for example, according to example methods presented in FIGS. 6-8.

Figure 6A:
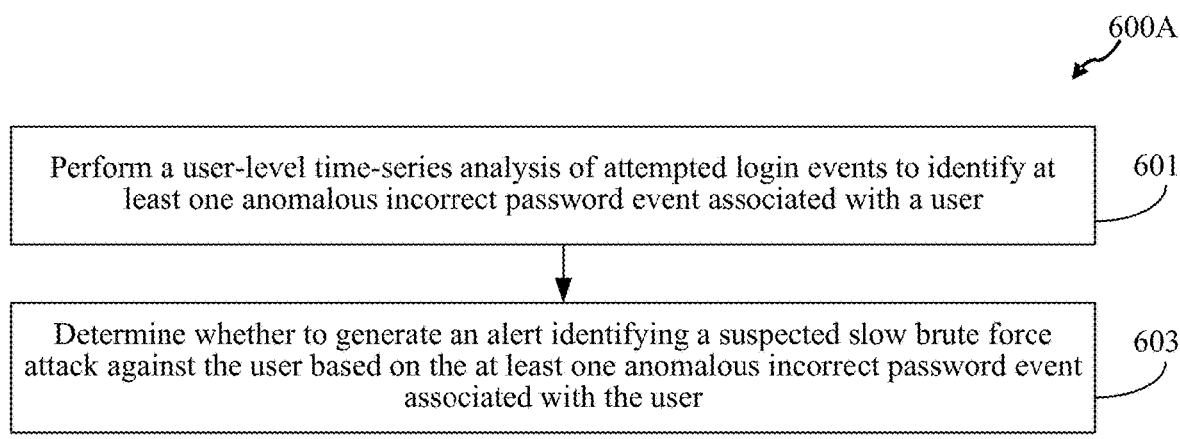
FIGS. 6A and 6B show flowcharts of methods for detection of a slow brute force attack based on a user-level time series analysis, according to example embodiments.
Figure 6B:
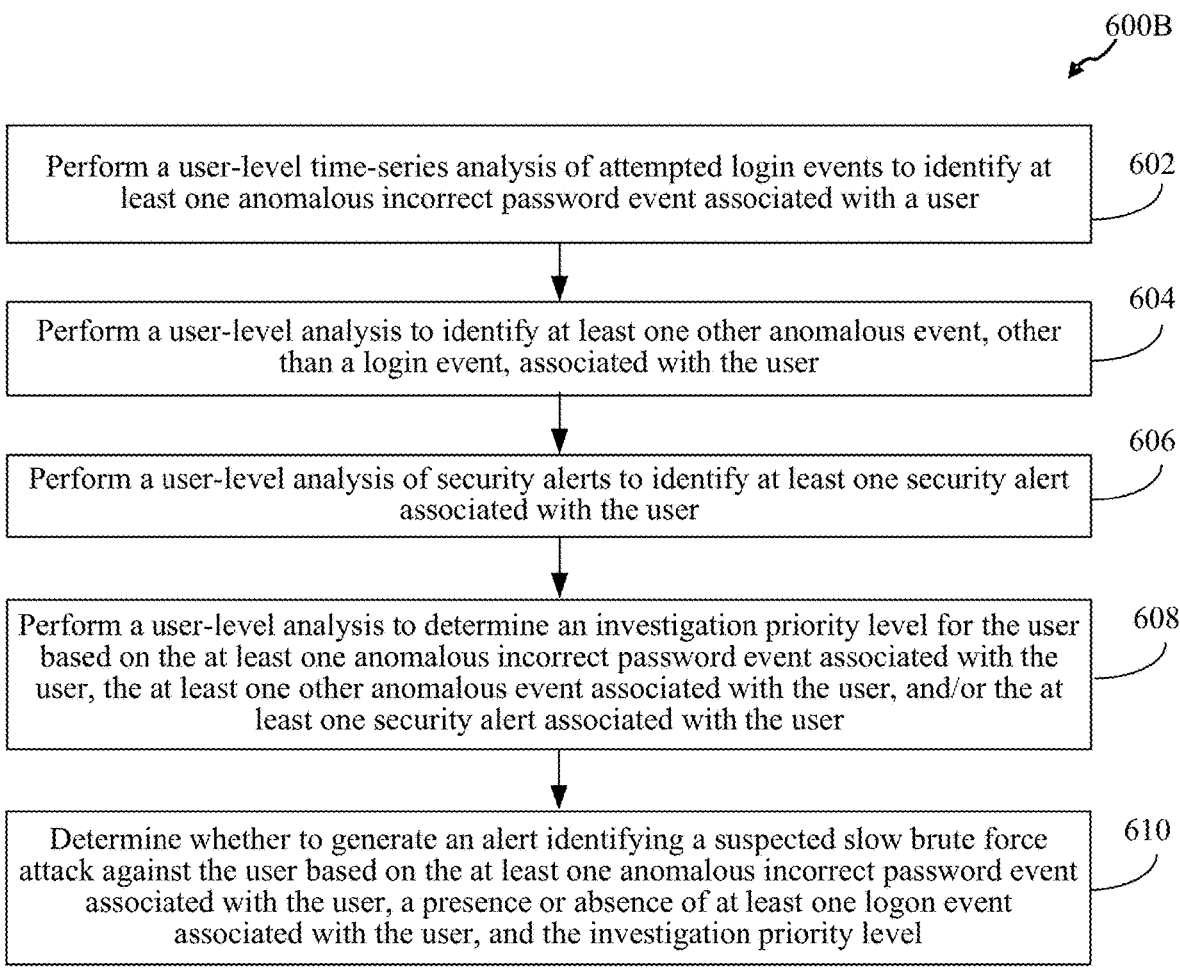

FIGS. 6A and 6B show flowcharts of methods 600A and 600B for detection of a slow brute force attack based on a user-level time series analysis, according to an example embodiment. Embodiments disclosed herein and other embodiments may operate in accordance with example methods 600A and/or 600B. Method 600A comprises steps 601 and 603 while method 600B comprises steps 602-610. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6A or 6B. Methods 600A and 600B are simply two of many possible embodiments. Embodiments may implement fewer, more or different steps.

Example method 600A comprises steps 601 and 603. In step 601, a user-level time-series analysis of attempted login events (e.g., failed attempts) may be performed (e.g., for each of multiple users) to identify (e.g., and score) one or more anomalous incorrect password entries associated with a (e.g., each) user. For example, as shown in FIGS. 1, 2 and 4, slow brute force attack detector 126/200 and/or incorrect password analyzer 216/416 may detect, analyze and score failed login attempts (e.g., incorrect password events) for (e.g., associated with) a (e.g., each) user.

In step 603, a determination may be made whether to generate an alert identifying a suspected slow brute force attack against the user based on the at least one anomalous incorrect password event associated with the user. For example, as shown in FIGS. 1 and 2, slow brute force attack detector 126/200 and/or alert generator 228 may analyze failed login events (e.g., alone or in conjunction with other information) to determine whether a user is subject to a slow brute force attack and may generate an alert in accordance with the determination. An alert may identify a suspected (e.g., successful or unsuccessful) slow brute force attack (e.g., with an associated compromised or uncompromised user) based (e.g., at least in part) on a time-series analysis to find abnormal login behavior at a user-by-user level.

Example method 600B comprises steps 602-610. In step 602, a user-level time-series analysis of attempted login events may be performed (e.g., for each of multiple users) to identify (e.g., and score) anomalous incorrect password entries associated with a (e.g., each) user. For example, as shown in FIGS. 1, 2 and 4, slow brute force attack detector 126/200 and/or incorrect password analyzer 216/416 may detect, analyze and score failed login attempts (e.g., incorrect password events) for (e.g., associated with) a (e.g., each) user.

In step 604, a user-level analysis may be performed to identify (e.g., and score) at least one other anomalous event (e.g., other than a login event) associated with the user. For example, as shown in FIGS. 1, 2 and 3, slow brute force attack detector 126/200 and/or event analyzer 218/318 may detect, analyze and score events (e.g., other than failed and successful login events) associated with a (e.g., each) user.

In step 606, a user-level analysis of security alerts may be performed to identify (e.g., and score) at least one security alert associated with the user. For example, as shown in FIGS. 1 and 2, slow brute force attack detector 126/200 and/or security alert analyzer 226 may identify and score security alerts associated with a (e.g., each) user.

In step 608, a user-level analysis may be performed to determine an investigation priority level for the user based on (e.g., scores for) the at least one anomalous incorrect password entry associated with the user, and a presence or absence of at least one other anomalous event associated with the user and at least one security alert associated with the user. For example, as shown in FIGS. 1 and 2, slow brute force attack detector 126/200 and/or investigation priority analyzer 230 may determine an investigation priority level for a user based on (e.g., scores for) the anomalous incorrect password entries associated with the user, the other anomalous events associated with the user, and/or the security alerts associated with the user.

In step 610, a determination may be made whether to generate an alert identifying a suspected slow brute force attack against the user based on (e.g., score for) the at least one anomalous incorrect password event associated with the user, a presence or absence of at least one successful logon event associated with the user, and the investigation priority level (e.g., score). An alert may indicate whether a user (e.g., who may be subject to a slow brute force attack) is a compromised user or an uncompromised user. For example, as shown in FIGS. 1 and 2, slow brute force attack detector 126/200 and/or alert generator 228 may analyze failed login events (e.g., alone or in conjunction with other information) to determine whether a user is compromised or not and may generate an alert in accordance with the determination. An alert may identify a suspected (e.g., successful or unsuccessful) slow brute force attack (e.g., with an associated compromised or uncompromised user) based (e.g., at least in part) on a time-series analysis to find abnormal login behavior at a user-by-user level.

Figure 7:
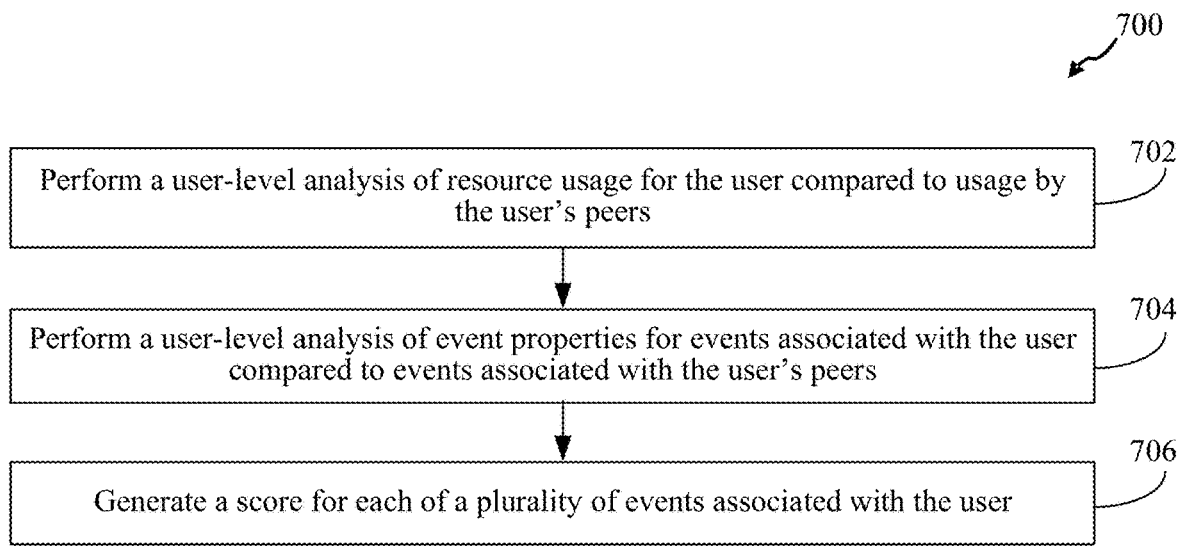
FIG. 7 shows a flowchart of a method for detecting, analyzing and scoring other anomalous events, according to an example embodiment.

FIG. 7 shows a flowchart of a method 700 for detecting, analyzing and scoring other anomalous events. Embodiments disclosed herein and other embodiments may operate in accordance with example method 700. Method 700 comprises steps 702-706. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

In step 702, a user-level analysis of resource usage may be performed for a user compared to usage by the user's peers. For example, as shown in FIGS. 1 and 2, slow brute force attack detector 126/200, events analyzer 218/318 and/or resource category analyzer 340 may perform a user-level analysis of resource usage for a (e.g., each) user compared to usage by the user's peers.

In step 704, a user-level analysis of event properties may be performed for events associated with the user compared to events associated with the user's peers. For example, as shown in FIGS. 1 and 2, slow brute force attack detector 126/200, events analyzer 218/318 and/or event properties analyzer 342 may perform a user-level analysis of event properties for events associated with the user compared to events associated with the user's peers.

In step 706, a score may be generated for each of a plurality of events associated with the user. For example, as shown in FIGS. 1 and 2, slow brute force attack detector 126/200, events analyzer 218/318 and/or event scorer 344 may score received events, for example, based (e.g., at least in part) on statistics maintained by resource category analyzer 340 and event properties analyzer 342. Event scorer 344 may generate a threat score value for an (e.g., each) event. A threat score value may, for example, range from 0 to 10, where a score of 0 may indicate that the event is not anomalous and a score of 10 may indicate that the event is anomalous (e.g., and therefore suspicious).

Figure 8:
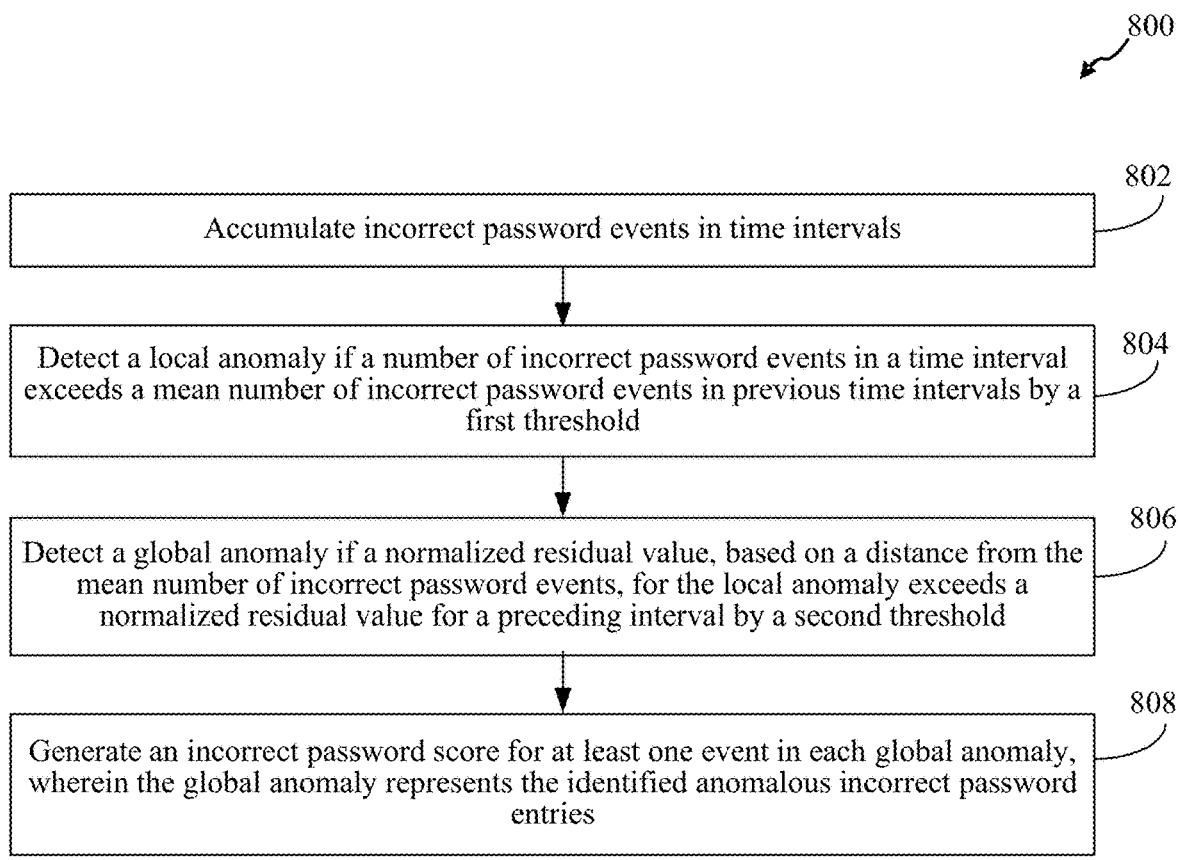
FIG. 8 shows a flowchart of another method for detecting, analyzing and scoring anomalous failed login events, according to an example embodiment.

FIG. 8 shows a flowchart of a method 800 for detecting, analyzing and scoring anomalous failed login events. Embodiments disclosed herein and other embodiments may operate in accordance with example method 800. Method 800 comprises steps 802-808. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

In step 802, incorrect password events may be accumulated in time intervals (e.g., buckets or windows). For example, as shown in FIGS. 1 and 2, slow brute force attack detector 126/200 and/or state updater 432 may accumulate received events in time intervals (e.g., 8-hour intervals) and maintain a state (e.g., accumulated number of incorrect password events) for each time interval.

In step 804, a local anomaly may be detected if a number of incorrect password events in a time interval exceeds a mean number of incorrect password events in previous time intervals by a first threshold. For example, as shown in FIGS. 1 and 2, slow brute force attack detector 126/200 and/or local anomaly detector 434 may detect a local anomaly, for example, if a number of incorrect password events in a time interval exceeds a mean number (e.g., or other configurable number) of incorrect password events in (e.g., a configurable number of) previous time intervals by a (e.g., configurable) first threshold.

In step 806, a global anomaly may be detected if a normalized residual value (e.g., based on a distance from the mean number of incorrect password events) for the local anomaly exceeds a normalized residual value for a preceding interval by a second threshold. For example, as shown in FIGS. 1 and 2, slow brute force attack detector 126/200 and/or global anomaly detector 436 may detect a global anomaly, for example, if a (e.g., normalized) residual value for the detected local anomaly exceeds a (e.g., normalized) residual value for a (e.g., configurable) preceding interval by a (e.g., configurable) second threshold.

In step 808, incorrect password scores may be generated for each global anomaly, where each global anomaly represents an identified anomalous incorrect password entry. For example, as shown in FIGS. 1 and 2, slow brute force attack detector 126/200 and/or incorrect password scorer 438 may score a (e.g., each) global anomaly.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/ electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
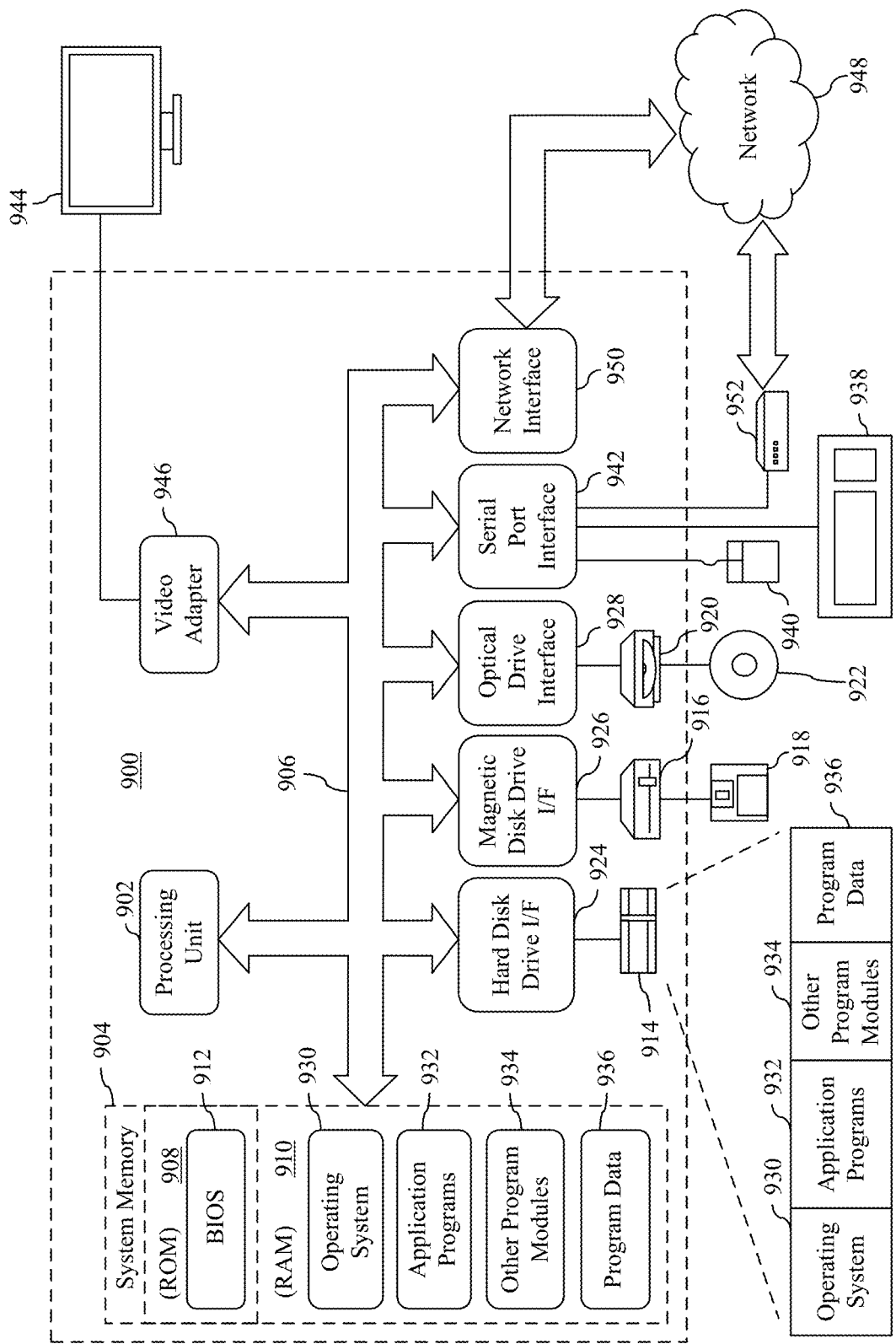
FIG. 9 shows a block diagram of an example computing device that may be used to implement example embodiments.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for detection of slow brute force attacks based on user-level time series analysis. In examples, a method may determine whether one or more users are a target of a slow brute force attack. A method may comprise, for example, performing a user-level time-series analysis of attempted login events to identify at least one anomalous incorrect password event associated with a user; and determining whether to generate an alert identifying a suspected slow brute force attack against the user based on the at least one anomalous incorrect password event associated with the user.

In example, the alert may indicate the user is one of a compromised user or an uncompromised user based, at least in part, on the at least one anomalous incorrect password event and a presence or absence of at least one logon event associated with the user.

The method may further comprise, for example, performing a user-level analysis to determine an investigation priority level for the user associated with the at least one anomalous incorrect password event.

The method may further comprise, for example, performing a user-level analysis to identify at least one other anomalous event, other than a login event, associated with the user.

The method may further comprise, for example, performing a user-level analysis of security alerts to identify at least one security alert associated with the user.

The method may further comprise, for example, generating at least one incorrect password score for the at least one anomalous incorrect password event associated with the user; generating at least one event score for the at least one anomalous event associated with the user; generating at least one security alert score for the at least one security alert associated with the user; and generating an investigation priority score based on the at least one anomalous incorrect password score, the at least one event score and the at least one security alert score; wherein determining whether to generate and alert identifying a suspected slow brute force attack against the user comprises determining whether to generate an alert based on the at least one anomalous incorrect password event associated with the user, a presence or absence of at least one logon event associated with the user, and the investigation priority score.

In examples, performing a user-level analysis to identify at least one other anomalous event may comprise, for example, performing a user-level analysis of resource usage for the user compared to resource usage by the user's peers; performing a user-level analysis of event properties for events associated with the user compared to event properties for events associated with the user's peers; and generating a score for the at least one anomalous event associated with the user based on at least one of the comparative analysis of the resource usage or the event properties.

In examples, performing a user-level time-series analysis of attempted login events to identify at least one anomalous incorrect password event may comprise, for example, accumulating incorrect password events in time intervals; detecting a local anomaly in response to a number of incorrect password events in a time interval exceeding a mean number of incorrect password events in at least one previous time interval by a first threshold; detecting a global anomaly in response to a normalized residual value, based on a distance from the mean number of incorrect password events, for the local anomaly exceeding a normalized residual value for at least one preceding time interval by a second threshold; and generating an incorrect password score for at least one event in each global anomaly, wherein the at least one event in each global anomaly represents the at least one identified anomalous incorrect password event.

In examples, a system may comprise, for example, one or more processors; and one or more memory devices that store program code configured to be executed by the one or more processors, the program code comprising: an incorrect password analyzer configured to perform a user-level time-series analysis of attempted login events to identify at least one anomalous incorrect password event associated with a user; and an alert generator configured to determine whether to generate an alert identifying a suspected slow brute force attack against the user based on the at least one anomalous incorrect password event associated with the user.

In examples, the alert may indicate whether the user is one of a compromised user or an uncompromised user based, at least in part, on the at least one anomalous incorrect password event and a presence or absence of at least one logon event associated with the user.

In examples, the program code may further comprise an investigation priority analyzer configured to perform a user-level analysis to determine an investigation priority level for the user associated with the at least one anomalous incorrect password event.

In examples, the program code may further comprise an event analyzer configured to perform a user-level analysis to identify at least one other anomalous event, other than a login event, associated with the user.

In examples, the program code may further comprise a security alert analyzer configured to perform a user-level analysis of security alerts to identify at least one security alert associated with the user.

In examples, the incorrect password analyzer may be configured to generate at least one incorrect password score for the at least one anomalous incorrect password event associated with the user. The investigation priority analyzer may be configured to generate at least one event score for the at least one anomalous event associated with the user. The security alert analyzer may be configured to generate at least one security alert score for the at least one security alert associated with the user. The investigation priority analyzer may be configured to generate an investigation priority score based on the at least one anomalous incorrect password score, the at least one event score and the at least one security alert score. The alert generator may be configured to determine whether to generate an alert identifying a suspected slow brute force attack against the user based on the at least one anomalous incorrect password event associated with the user, a presence or absence of at least one logon event associated with the user, and the investigation priority score.

In examples, the event analyzer may comprises, for example, a resource category analyzer configured to perform a user-level analysis of resource usage for the user compared to resource usage by the user's peers; an event properties analyzer configured to perform a user-level analysis of event properties for events associated with the user compared to event properties for events associated with the user's peers; and an event scorer configured to generate a score for the at least one anomalous event associated with the user based on at least one of the comparative analysis of the resource usage or the event properties.

In examples, the incorrect password analyzer may comprise, for example, a state updater configured to accumulate incorrect password events in time intervals; a local anomaly detector configured to detect a local anomaly in response to a number of incorrect password events in a time interval exceeding a mean number of incorrect password events in at least one previous time interval by a first threshold; a global anomaly detector configured to detect a global anomaly in response to a normalized residual value, based on a distance from the mean number of incorrect password events, for the local anomaly exceeding a normalized residual value for at least one preceding time interval by a second threshold; and an incorrect password scorer configured to generate incorrect password scores for at least one event in each global anomaly, wherein the at least one event in each global anomaly represents the at least one anomalous incorrect password event.

In examples, a computer-readable storage medium may have program instructions recorded thereon that, when executed by a processing circuit, perform a method comprising, for example, performing a user-level time-series analysis of password entries to identify at least one anomalous incorrect password entry associated with a user; performing a user-level time-series analysis to identify an anomalous activity associated with the user and proximate in time to the anomalous incorrect password entry; and determining whether to generate an alert identifying a suspected slow brute force attack against the user based on the at least one anomalous incorrect password event associated with the user and the anomalous activity associated with the user.

In examples, the alert may indicate the user is one of a compromised user and an uncompromised user based, at least in part, on the at least one anomalous incorrect password entry associated with the user, the at least one anomalous activity associated with the user, and a presence or absence of at least one logon event associated with the user.

In examples, performing the user-level time-series analysis to identify an anomalous event may comprise, for example, performing a user-level analysis of resource usage for the user compared to resource usage by the user's peers; performing a user-level analysis of event properties for events associated with the user compared to event properties for events associated with the user's peers; and generating a score for the at least one anomalous event associated with the user based on at least one of the comparative analysis of the resource usage or the event properties.

In examples, performing the user-level time-series analysis of password entries to identify at least one anomalous incorrect password entry may comprise, for example, accumulating incorrect password events in time intervals; detecting a local anomaly in response to a number of incorrect password events in a time interval exceeding a mean number of incorrect password events in at least one previous time interval by a first threshold; detecting a global anomaly in response to a normalized residual value, based on a distance from the mean number of incorrect password events, for the local anomaly exceeding a normalized residual value for at least one preceding time interval by a second threshold; and generating an incorrect password score for at least one event in each global anomaly, wherein the at least one event in each global anomaly represents the at least one anomalous incorrect password entry

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   one or more processors; and
   one or more memory devices that store program code configured to be executed by the one or more processors, the program code comprising:
   an incorrect password analyzer configured to:
      perform a user-level time-series analysis of attempted login events to identify at least one anomalous incorrect password event associated with a user, and generate at least one incorrect password score for the at least one anomalous password event;
an investigation priority analyzer configured to:
perform a user-level analysis to determine an investigation priority score for the user based on the at least one incorrect password score; and
an alert generator configured to:
determine whether to generate an alert identifying a suspected slow brute force attack against the user based on the at least one anomalous incorrect password event associated with the user and the investigation priority score.

2. The system of claim 1, wherein the alert indicates the user is one of a compromised user or an uncompromised user based, at least in part, on the at least one anomalous incorrect password event and a presence or absence of at least one logon event associated with the user.

3. The system of claim 1, wherein the program code further comprises:
an event analyzer configured to:
perform a user-level analysis to identify at least one other anomalous event, other than a login event, associated with the user.

4. The system of claim 3, wherein the program code further comprises:
a security alert analyzer configured to:
perform a user-level analysis of security alerts to identify at least one security alert associated with the user.

5. The system of claim 4, wherein:
the investigation priority analyzer is configured to:
generate at least one event score for the at least one anomalous event associated with the user;
the security alert analyzer is configured to:
generate at least one security alert score for the at least one security alert associated with the user;
the investigation priority analyzer is configured to:
generate the investigation priority score based on the at least one anomalous incorrect password score, the at least one event score, and the at least one security alert score; and
the alert generator is configured to:
determine whether to generate an alert identifying a suspected slow brute force attack against the user based on the at least one anomalous incorrect password event associated with the user, a presence or absence of at least one logon event associated with the user, and the investigation priority score.

6. The system of claim 3, wherein:
the event analyzer comprises:
a resource category analyzer configured to perform a user-level analysis of resource usage for the user compared to resource usage by the user's peers;
an event properties analyzer configured to perform a user-level analysis of event properties for events associated with the user compared to event properties for events associated with the user's peers; and
an event scorer configured to generate a score for the at least one anomalous event associated with the user based on at least one of the comparative analysis of the resource usage or the comparative analysis of the event properties.

7. A system, comprising:
one or more processors; and
one or more memory devices that store program code configured to be executed by the one or more processors, the program code comprising:
an incorrect password analyzer configured to perform a user-level time-series analysis of attempted login events to identify at least one anomalous incorrect password event associated with a user, wherein the incorrect password analyzer comprises:
a state updater configured to accumulate incorrect password events in time intervals;
a local anomaly detector configured to detect a local anomaly in response to a number of incorrect password events in a time interval exceeding a mean number of incorrect password events in at least one previous time interval by a first threshold;
a global anomaly detector configured to detect a global anomaly in response to a normalized residual value, based on a distance from the mean number of incorrect password events, for the local anomaly exceeding a normalized residual value for at least one preceding time interval by a second threshold;
an incorrect password scorer configured to generate incorrect password scores for at least one event in each global anomaly, wherein the at least one event in each global anomaly represents the at least one anomalous incorrect password event; and
an alert generator configured to:
determine whether to generate an alert identifying a suspected slow brute force attack against the user based on the at least one anomalous incorrect password event associated with the user.

8. The system of claim 7, wherein the alert indicates the user is one of a compromised user or an uncompromised user based, at least in part, on the at least one anomalous incorrect password event and a presence or absence of at least one logon event associated with the user.

9. A method that determines whether one or more users are a target of a slow brute force attack, the method comprising:
performing a user-level time-series analysis of attempted login events to identify at least one anomalous incorrect password event associated with a user of the one or more users;
generating at least one incorrect password score for the at least one anomalous incorrect password event associated with the user;
performing a user-level analysis to determine an investigation priority score for the user based on the at least one incorrect password score; and
determining whether to generate an alert identifying a suspected slow brute force attack against the user based on the at least one anomalous incorrect password event associated with the user and the investigation priority score.

10. The method of claim 9, wherein the alert indicates the user is one of a compromised user or an uncompromised user based, at least in part, on the at least one anomalous incorrect password event and a presence or absence of at least one logon event associated with the user.

11. The method of claim 9, further comprising:
performing a user-level analysis to identify at least one other anomalous event, other than a login event, associated with the user.

12. The method of claim 11, further comprising:
performing a user-level analysis of security alerts to identify at least one security alert associated with the user.

13. The method of claim 12, further comprising:
generating at least one event score for the at least one anomalous event associated with the user; and
generating at least one security alert score for the at least one security alert associated with the user;
wherein said generating the investigation priority score based on the at least one anomalous incorrect password score, the at least one event score, and the at least one security alert score, and
wherein said determining whether to generate an alert identifying a suspected slow brute force attack against the user comprises determining whether to generate an alert based on the at least one anomalous incorrect password event associated with the user, a presence or absence of at least one logon event associated with the user, and the investigation priority score.

14. The method of claim 11, wherein performing a user-level analysis to identify at least one other anomalous event comprises:
performing a user-level analysis of resource usage for the user compared to resource usage by the user's peers;
performing a user-level analysis of event properties for events associated with the user compared to event properties for events associated with the user's peers; and
generating a score for the at least one anomalous event associated with the user based on at least one of the comparative analysis of the resource usage or the comparative analysis of the event properties.

15. A method that determines whether one or more users are a target of a slow brute force attack, the method comprising:
performing a user-level time-series analysis of attempted login events to identify at least one anomalous incorrect password event associated with a user of the one or more users, comprising:
accumulating incorrect password events in time intervals;
detecting a local anomaly in response to a number of incorrect password events in a time interval exceeding a mean number of incorrect password events in at least one previous time interval by a first threshold;
detecting a global anomaly in response to a normalized residual value, based on a distance from the mean number of incorrect password events, for the local anomaly exceeding a normalized residual value for at least one preceding time interval by a second threshold;
generating an incorrect password score for at least one event in each global anomaly, wherein the at least one event in each global anomaly represents the at least one identified anomalous incorrect password event; and
determining whether to generate an alert identifying a suspected slow brute force attack against the user based on the at least one anomalous incorrect password event associated with the user.

16. The method of claim 15, wherein the alert indicates the user is one of a compromised user or an uncompromised user based, at least in part, on the at least one anomalous incorrect password event and a presence or absence of at least one logon event associated with the user.

17. The method of claim 15, wherein performing a user-level analysis to identify at least one other anomalous event comprises:
performing a user-level analysis of resource usage for the user compared to resource usage by the user's peers;
performing a user-level analysis of event properties for events associated with the user compared to event properties for events associated with the user's peers; and
generating a score for the at least one anomalous event associated with the user based on at least one of the comparative analysis of the resource usage or the comparative analysis of the event properties.

18. A computer-readable storage medium having program instructions recorded thereon that, when executed by a processing circuit, perform a method comprising:
performing a user-level time-series analysis of password entries to identify at least one anomalous incorrect password event associated with a user, comprising:
accumulating incorrect password events in time intervals;
detecting a local anomaly in response to a number of incorrect password events in a time interval exceeding a mean number of incorrect password events in at least one previous time interval by a first threshold;
detecting a global anomaly in response to a normalized residual value, based on a distance from the mean number of incorrect password events, for the local anomaly exceeding a normalized residual value for at least one preceding time interval by a second threshold; and
generating an incorrect password score for at least one event in each global anomaly, wherein the at least one event in each global anomaly represents the at least one anomalous incorrect password event;
performing a user-level time-series analysis to identify an anomalous activity associated with the user and proximate in time to the at least one anomalous incorrect password event; and
determining whether to generate an alert identifying a suspected slow brute force attack against the user based on the at least one anomalous incorrect password event associated with the user and the anomalous activity associated with the user.

19. The computer-readable storage medium of claim 18, wherein the alert indicates the user is one of a compromised user and an uncompromised user based, at least in part, on the at least one anomalous incorrect password event associated with the user, the at least one anomalous activity associated with the user, and a presence or absence of at least one logon event associated with the user.

20. The computer-readable storage medium of claim 18, wherein performing the user-level time-series analysis to identify the anomalous activity comprises:
performing a user-level analysis of resource usage for the user compared to resource usage by the user's peers;
performing a user-level analysis of event properties for events associated with the user compared to event properties for events associated with the user's peers; and
generating a score for the at least one anomalous activity associated with the user based on at least one of the comparative analysis of the resource usage or the comparative analysis of the event properties.

* * * * *